(12) United States Patent
Rengakuji

(10) Patent No.: US 6,212,300 B1
(45) Date of Patent: Apr. 3, 2001

(54) IMAGE PROCESSING APPARATUS, METHOD AND COMPUTER-EXECUTABLE PROGRAM PRODUCT FOR CONVERTING THE FORMAT OF DATA FOR SPECIFIC IMAGE DATA

(75) Inventor: Hideyuki Rengakuji, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/092,081

(22) Filed: Jun. 5, 1998

(30) Foreign Application Priority Data

Jun. 6, 1997 (JP) .................................................. 9-149434

(51) Int. Cl.[7] ...................................................... G06K 9/36
(52) U.S. Cl. ........................... 382/232; 382/236; 358/435
(58) Field of Search ................................... 382/232, 236; 358/435; 348/750, 565, 220

(56) References Cited

U.S. PATENT DOCUMENTS 5,467,413 * 11/1995 Barrett .................................. 382/236

5,875,039 * 2/1999 Ohsawa et al. ....................... 358/435

FOREIGN PATENT DOCUMENTS

B-66067   2/1996 (AU) ............................... H04N/7/13

* cited by examiner

Primary Examiner—Jose L. Couso
Assistant Examiner—Anh Hong Do
(74) Attorney, Agent, or Firm—Fitzpatrick, Cella, Harper & Scinto

(57) ABSTRACT

An image processing apparatus, method and computer-executable program product for converting a data format of specific image data and, in particular, for performing block/raster conversion on color image data, converts image data between a raster form and a block form by supplying image data having a plurality of components in a first form, changing the order of the plurality of components and controlling storing of image data to a memory which stores the image data temporarily such that the image data is stored in the memory for each component and by reading out from the memory in a second form which is different from the first form.

9 Claims, 17 Drawing Sheets

(ATTACHED CHARACTERS REPRESENT PIXEL NUMBERS)

| ORDER OF READING | ORDER OF WRITING |
|---|---|
| SEGMENT 0<br>SEGMENT H/8<br>SEGMENT 2H/8<br>.<br>.<br>.<br>SEGMENT 6H/8<br>SEGMENT 7H/8<br>SEGMENT 1<br>SEGMENT H/8+1<br>.<br>.<br>.<br>SEGMENT 6H/8+1<br>SEGMENT 7H/8+1<br>SEGMENT 2<br>SEGMENT H/8+2<br>SEGMENT 2H+2<br>.<br>.<br>.<br>SEGMENT 5H/8+(H/8-1)<br>SEGMENT 6H/8+(H/8-1)<br>SEGMENT 7H/8+(H/8-1) | SEGMENT 0<br>SEGMENT 1<br>SEGMENT 2<br>.<br>.<br>.<br>SEGMENT 6<br>SEGMENT 7<br>SEGMENT 8<br>SEGMENT 9<br>.<br>.<br>.<br>SEGMENT 14<br>SEGMENT 15<br>SEGMENT 16<br>SEGMENT 17<br>SEGMENT 18<br>.<br>.<br>.<br>SEGMENT 7H/8+(H/8-3)<br>SEGMENT 7H/8+(H/8-2)<br>SEGMENT 7H/8+(H/8-1) |

FIG.14

FIG.15A ADDRESS OF SEL

| (0) | (1) | (2) | (3) | (4) | (5) | (6) | (7) | (8) | (9) | (10) | (11) |
|---|---|---|---|---|---|---|---|---|---|---|---|
| (12) | (13) | (14) | (15) | (16) | (17) | (18) | (19) | (20) | (21) | (22) | (23) |
| (24) | (25) | (26) | (27) | (28) | (29) | (30) | (31) | (32) | (33) | (34) | (35) |
| (36) | (37) | (38) | (39) | (40) | (41) | (42) | (43) | (44) | (45) | (46) | (47) |
| (48) | (49) | (50) | (51) | (52) | (53) | (54) | (55) | (56) | (57) | (58) | (59) |
| (60) | (61) | (62) | (63) | (64) | (65) | (66) | (67) | (68) | (69) | (70) | (71) |
| (72) | (73) | (74) | (75) | (76) | (77) | (78) | (79) | (80) | (81) | (82) | (83) |
| (84) | (85) | (86) | (87) | (88) | (89) | (90) | (91) | (92) | (93) | (94) | (95) |

THE CONDITION WHERE THE FIRST 8H RASTERS ARE WRITTEN

FIG.15B

| 0 | 1 | 2 | 3 | 4 | 5 | 6 | 7 | 8 | 9 | 10 | 11 |
|---|---|---|---|---|---|---|---|---|---|---|---|
| 12 | 13 | 14 | 15 | 16 | 17 | 18 | 19 | 20 | 21 | 22 | 23 |
| 24 | 25 | 26 | 27 | 28 | 29 | 30 | 31 | 32 | 33 | 34 | 35 |
| 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 |
| 72 | 73 | 74 | 75 | 76 | 77 | 78 | 79 | 80 | 81 | 82 | 83 |
| 84 | 85 | 86 | 87 | 88 | 89 | 90 | 91 | 92 | 93 | 94 | 95 |

↓ READ/WRITE 8H IMAGE DATA

THE CONDITION WHERE THE SECOND 8H RASTERS ARE WRITTEN

FIG.15C

| 0 | 8 | 16 | 24 | 32 | 40 | 48 | 56 | 64 | 72 | 80 | 88 |
|---|---|---|---|---|---|---|---|---|---|---|---|
| 1 | 9 | 17 | 25 | 33 | 41 | 49 | 57 | 65 | 73 | 81 | 89 |
| 2 | 10 | 18 | 26 | 34 | 42 | 50 | 58 | 66 | 74 | 82 | 90 |
| 3 | 11 | 19 | 27 | 35 | 43 | 51 | 59 | 67 | 75 | 83 | 91 |
| 4 | 12 | 20 | 28 | 36 | 44 | 52 | 60 | 68 | 76 | 84 | 92 |
| 5 | 13 | 21 | 29 | 37 | 45 | 53 | 61 | 69 | 77 | 85 | 93 |
| 6 | 14 | 22 | 30 | 38 | 46 | 54 | 62 | 70 | 78 | 86 | 94 |
| 7 | 15 | 23 | 31 | 39 | 47 | 55 | 63 | 71 | 79 | 87 | 95 |

↓ READ/WRITE 8H IMAGE DATA

THE CONDITION WHERE THE THIRD 8H RASTERS ARE WRITTEN

FIG.15D

| 0 | 64 | 33 | 2 | 66 | 35 | 4 | 68 | 37 | 6 | 70 | 39 |
|---|---|---|---|---|---|---|---|---|---|---|---|
| 8 | 72 | 41 | 10 | 74 | 43 | 12 | 76 | 45 | 14 | 78 | 47 |
| 16 | 80 | 49 | 18 | 82 | 51 | 20 | 84 | 53 | 22 | 86 | 55 |
| 24 | 88 | 57 | 26 | 90 | 59 | 28 | 92 | 61 | 30 | 94 | 63 |
| 32 | 1 | 65 | 34 | 3 | 67 | 36 | 5 | 69 | 38 | 7 | 71 |
| 40 | 9 | 73 | 42 | 11 | 75 | 44 | 13 | 77 | 46 | 15 | 79 |
| 48 | 17 | 81 | 50 | 19 | 83 | 52 | 21 | 85 | 54 | 23 | 87 |
| 56 | 25 | 89 | 58 | 27 | 91 | 60 | 29 | 93 | 62 | 31 | 95 |

↓ READ/WRITE 8H IMAGE DATA

THE CONDITION WHERE THE FOURTH 8H RASTERS ARE WRITTEN

FIG.15E

| 0 | 37 | 74 | 16 | 53 | 90 | 32 | 69 | 11 | 48 | 85 | 27 |
|---|---|---|---|---|---|---|---|---|---|---|---|
| 64 | 6 | 43 | 80 | 22 | 59 | 1 | 38 | 75 | 17 | 54 | 91 |
| 33 | 70 | 12 | 49 | 86 | 28 | 65 | 7 | 44 | 81 | 23 | 60 |
| 2 | 39 | 76 | 18 | 55 | 92 | 34 | 71 | 13 | 50 | 87 | 29 |
| 66 | 8 | 45 | 82 | 24 | 61 | 3 | 40 | 77 | 19 | 56 | 93 |
| 35 | 72 | 14 | 51 | 88 | 30 | 67 | 9 | 46 | 83 | 25 | 62 |
| 4 | 41 | 78 | 20 | 57 | 94 | 36 | 73 | 15 | 52 | 89 | 31 |
| 68 | 10 | 47 | 84 | 26 | 63 | 5 | 42 | 79 | 21 | 58 | 95 |

IMAGE PROCESSING APPARATUS, METHOD AND COMPUTER-EXECUTABLE PROGRAM PRODUCT FOR CONVERTING THE FORMAT OF DATA FOR SPECIFIC IMAGE DATA

BACKGROUND OF THE INVENTION

1. Field of the Invention

This invention relates to an image processing apparatus, method and computer-executable program product for converting the format of data for specific image data, and in particular, for converting the order of pixel data supplied in a predetermined format.

2. Description of the Related Art

A compression method with Discrete Cosine Transform (DCT), such as JPEG, has been used for compressing digital image data. Using DCT compression technique, it is necessary to divide image data into block form image data of a predetermined size, as shown in FIG. 1. When using the JPEG method, image data is divided into blocks of 8 pixels×8 pixels. Therefore, it is usually necessary to provide a buffer memory which is capable of storing image data of at least 8 lines to perform DCT in real time. Further, when raster image data is compressed in real time, it is necessary to use another buffer memory which hold the image data from image processor while the raster image data is divided into blocks.

However, conventionally, it is not possible to perform data format conversion efficiently. In particular, in a case where the raster image data is composed of plural components, the data format conversion becomes very inefficient.

SUMMARY OF THE INVENTION

The present invention addresses the above-mentioned shortcomings by performing block/raster conversion on color image data efficiently.

In one aspect, the present invention is an image processing apparatus which converts image data between a raster form and a block form, which comprises means for supplying image data having a plurality of components in a first form, means for changing the order of the plurality of components, and means for controlling storing of a memory which stores the image data temporarily such that the image data is stored in the memory for each component and is read out from the memory in a second form which is different from the first form.

Preferably, the first form is raster form and the second form is block form having a predetermined size.

The changing means changes the order of the components such that the components are output for each component in a predetermined unit.

The components are stored in different areas of the memory for each component.

More preferably, the apparatus further includes means for performing orthogonal transformation on the image data which is read out from the memory, the reading access of the memory means is performed in units of the block of the orthogonal transformation.

The control means controls storing of the image data to the memory means such that writing of the image data is prohibited in a predetermined time after the image data of a predetermined lines is written into the memory.

The predetermined time is a time which is necessary for reading the image data of one block unit of the orthogonal transformation.

The apparatus further comprising means for quantizing the image data which is transformed by the transforming means and means for performing variable-length coding on the image data output from the quantizing means.

This summary has been provided so that the nature of the invention may be understood quickly. A more complete understanding of the invention can be obtained by reference to the followed detailed description of the preferred embodiments thereof in connection with the attached Figures.

BRIEF DESCRIPTION OF THE DRAWINGS

FIGS. 14 and 15A–15E illustrate the address producing method of buffer memory 106.

DETAILED DESCRIPTION OF THE PREFERRED EMBODIMENT

The preferred embodiment of the invention will be explained with reference to the drawings.

Figure 1:
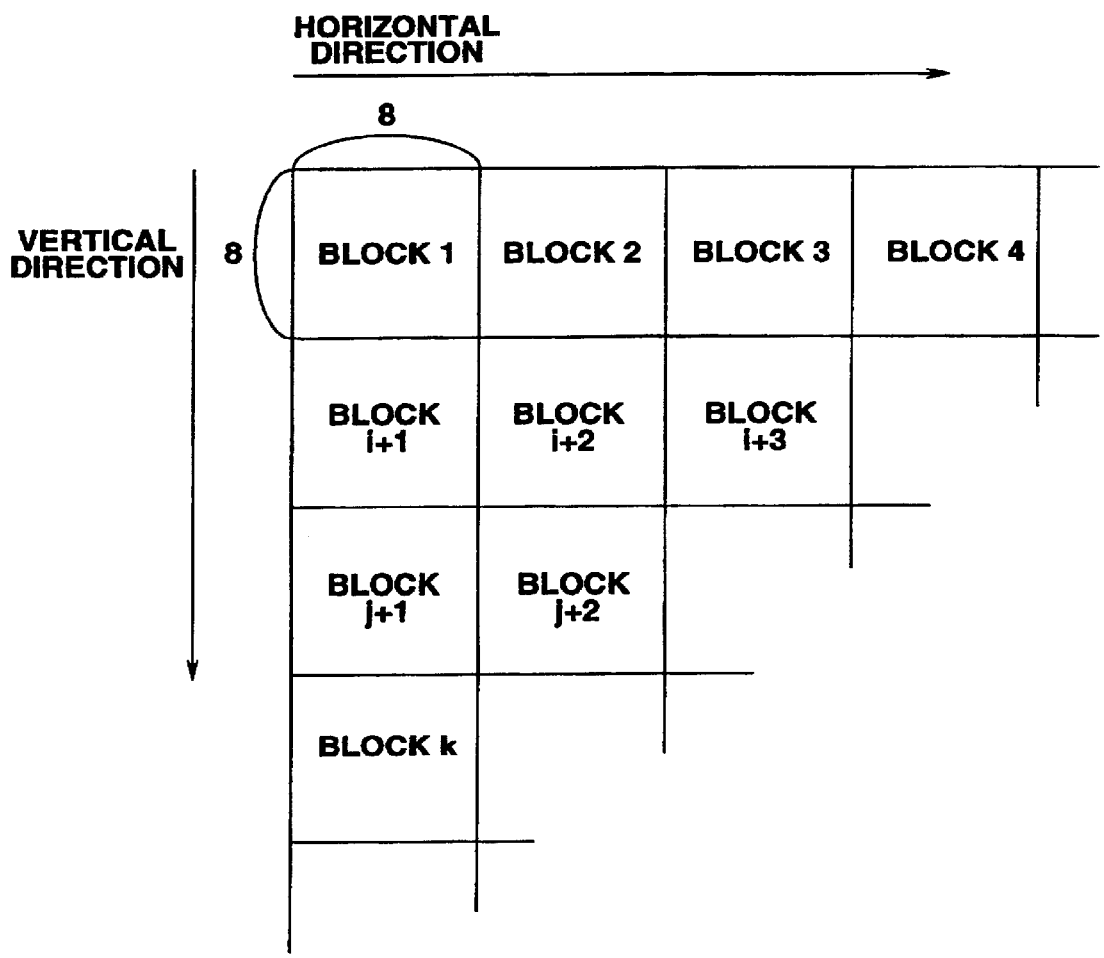
FIG. 1 illustrates the block dividing of image data.
Figure 2:
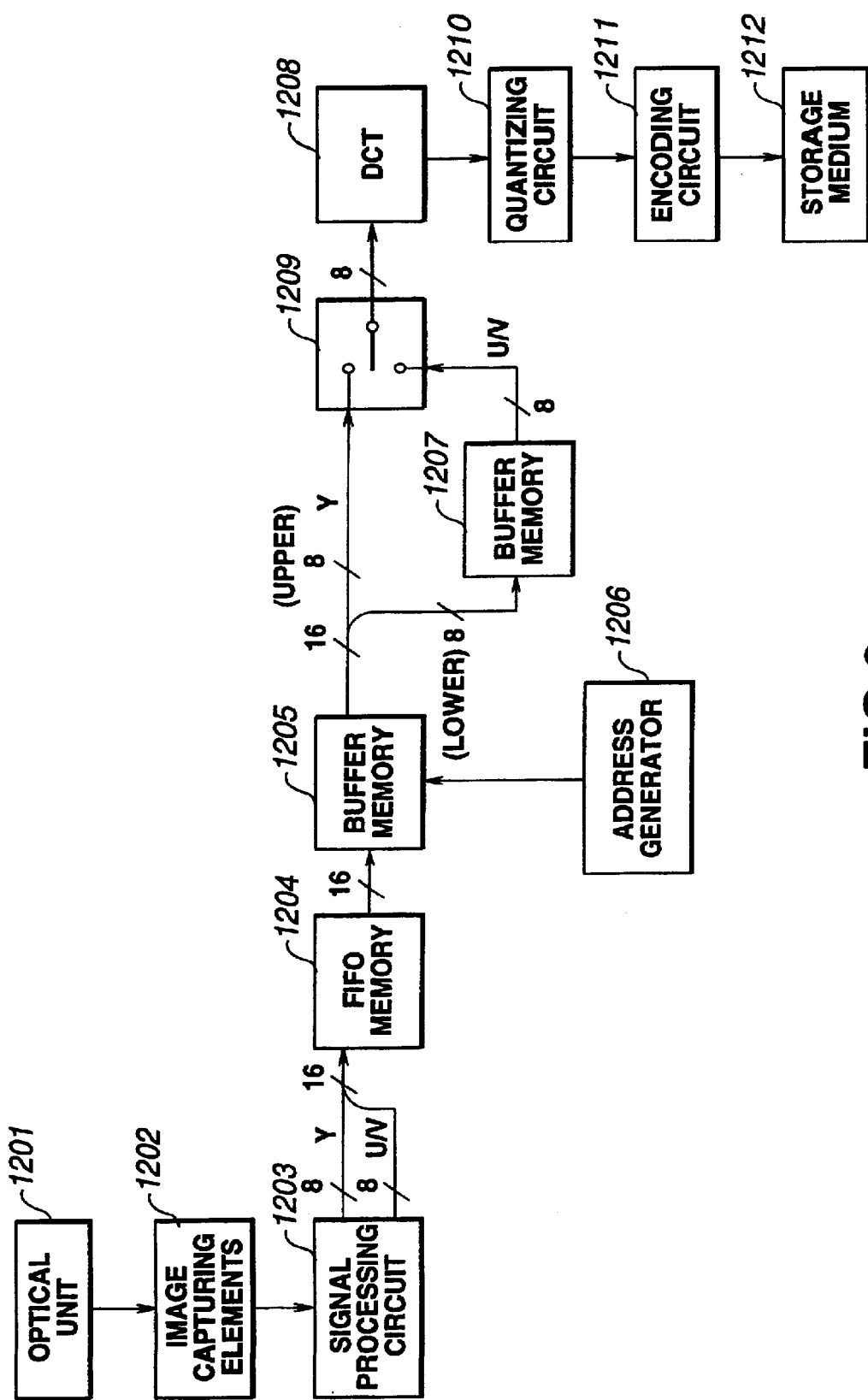
FIG. 2 shows an example of the structure for compressing image data in real time.

FIG. 2 shows an example of the structure for compressing image data in real time according to the present invention. The operation of dividing raster image data into blocks will be explained by referring to FIG. 2.

In FIG. 2, optical unit 1201 comprises at least a lens, a shutter and a stop. The light passing through optical unit 1201 is focused on image pick-up device 1202 which comprises at least a CCD unit and makes an image on it.

Image processing circuit 1203 processes the analog signal, which is output from image pick-up device 1202 and represents an image, and outputs digital image signal composed of luminance signal Y and color difference signals U/V.

FIFO (First In First Out) memory 1204 temporarily holds the signals output from signal processing circuit 1203.

Buffer memory 1205 is capable of holding image data of at least 8 lines. The address for writing-into/reading-out from buffer memory 1205 is generated by address generator 1206. Buffer memory 1207 has a capacity of memorizing image data of 2 blocks, as shown in the following formula:

8 pixels×8 pixels×8 bit/pixel×2=1 k bits

Image data selected by switch 1209 is transformed with two-dimensional DCT by DCT 1208 and quantized by quantizing circuit 1210 and encoded with a variable coding method by encoding circuit 1211.

The image data encoded by the above method is stored sequentially in storage medium 1212.

The image data output from signal processing circuit 1203 has a following relationship concerning even pixels and odd pixels.

Even pixel the upper 8 bits of image data P(x, y) is Y, the lower 8 bits is U

Odd pixel: the upper 8 bits of image data P(x, y) is Y, the lower 8 bits is V (Here, x is a horizontal position of the pixel, y is a vertical position of the pixel.)

As a result, the image data output from signal processing circuit 1203 is shown as follows if it is expressed time sequentially.

(Y0, U0), (Y1, V1), (Y2, U2), (Y3, V3), . . .

(Here, the numbers express the pixel number.)

That is, the number of color differential data U/V is 1/2 thinned-out compared to the number of luminance data Y.

The image data output from signal processing circuit 1203 is stored in buffer memory 1205 through FIFO memory 1204 according to the address generated by address generator 1206. The image data stored in buffer memory 1205 is read out according to the address generated by address generator 1206. That is, raster form image data is divided into blocks by read/write address of address generator 1206.

When image data is input from buffer memory 1205 to DCT 1208, luminance data Y is selected by switch 1209. That is, the luminance data Y, which is the upper 8 bits of the image data output from buffer memory 1205 as a divided block form, is supplied to DCT 1208. On the other hand, the color difference data U/V, which is the lower 8 bits of the image data output from buffer memory 1205 as a divided block form, is temporarily stored in buffer memory 1207.

Figure 3:
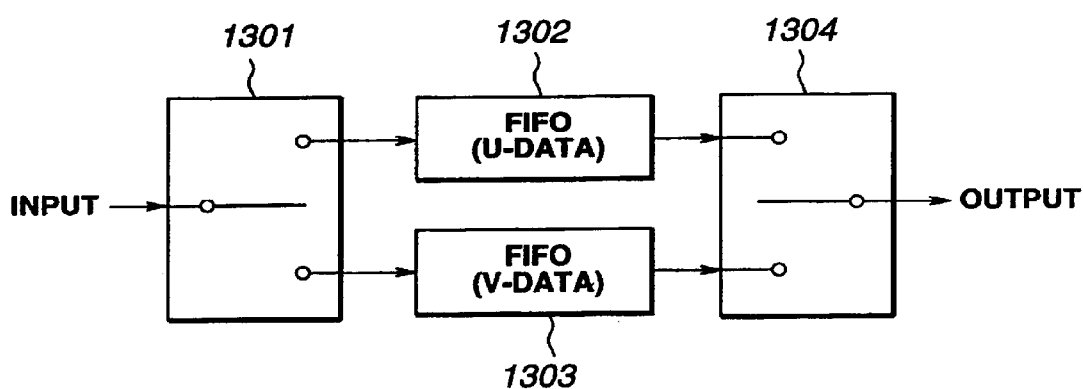
FIG. 3 shows an example of the structure of buffer memory 1207 shown in FIG. 2.

FIG. 3 shows an example of the structure of buffer memory 1207. U/V data are respectively stored in FIFO 1302 and FIFO 1303. U/V data can be selectively read out from FIFO 1302 and FIFO 1303 by switch 1304.

When the amount of image data read out from buffer memory 1205 reaches one MCU (Minimum Coded Unit), reading out of the image data from buffer memory 1205 is temporarily stopped. Here, MCU is a minimum process unit for performing DCT. For example, when Y, Y, U, V data is processed, that means, when two blocks of Y data and one block each of U/V data are transformed with DCT, one MCU is four blocks of data.

1MCU=8 pixels×8 pixels×8 bits×4=2 k bits

Next, U/V data is selected by switch 1209 and U/V data read out from buffer memory 1207 is supplied to DCT 1208. When reading out of U/V data from buffer memory 1207 is completed, one block each U/V data are sent to DCT 1208. As a result, image data of one MCU is sent to DCT 1208 in order of Y, Y, U, V.

While the block form image data is read out from buffer memory 1205, the data output from signal processing circuit 1203 is accumulated in FIFO memory 1204. When reading out of the image data of 8 lines stored in buffer memory 1205 is completed, that means when the block dividing of one MCU is finished, the transmission of the image data of the next 8 lines from FIFO memory 1204 to buffer memory 1205 is started.

Figure 4:
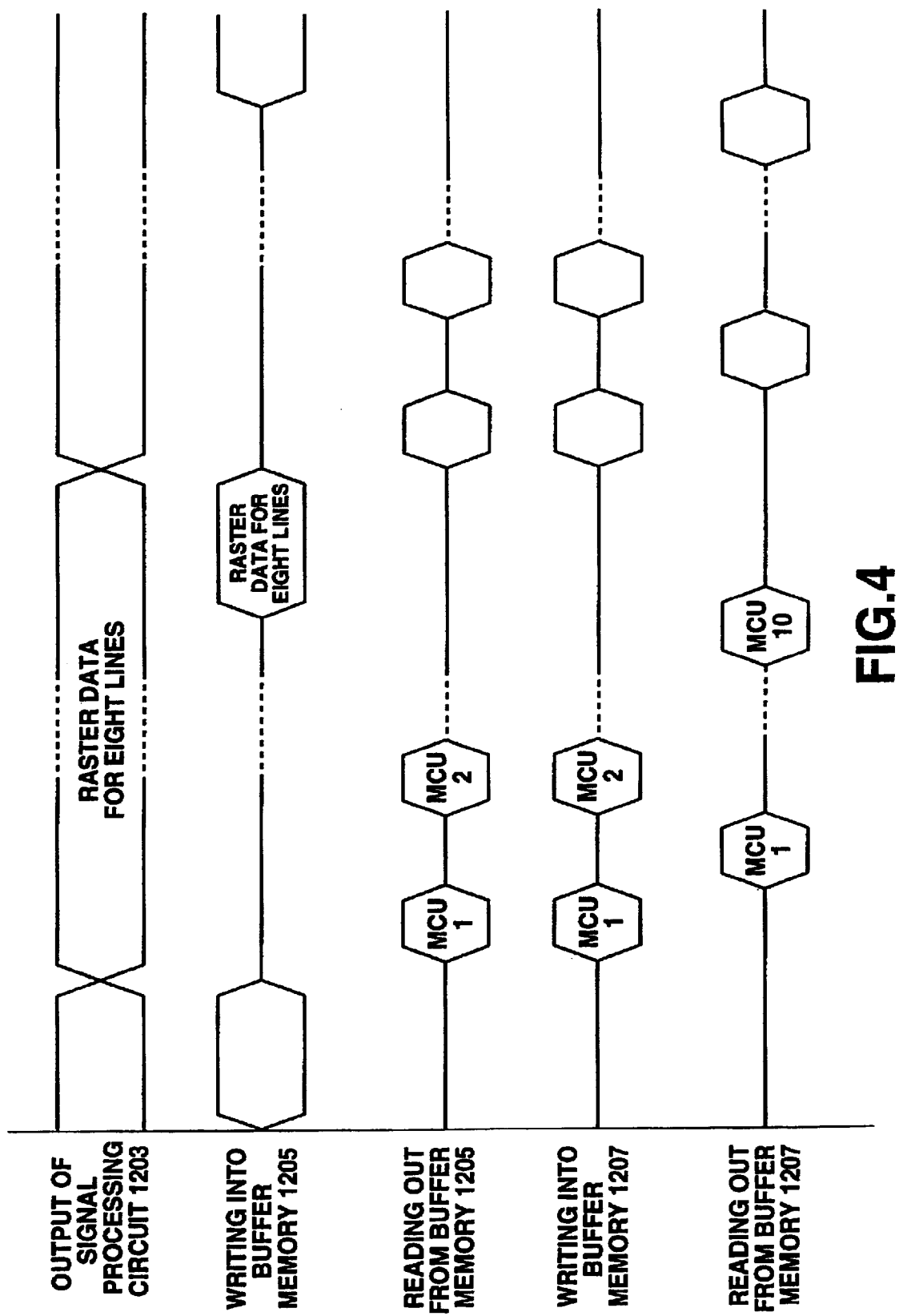
FIG. 4 shows an example of the write-in/read-out timing of buffer memories 1205 and 1207 shown in FIG. 2.

FIG. 4 shows an example of the write-in/read-out timing of buffer memories 1205 and 1207. The memory capacity necessary for FIFO 1204 depends on the transmission rate of the image data output from signal processing circuit 1203 and the speed of block dividing. At most, it requires the capacity for storing image data of 8 lines.

According to the above operation, image data of Y, U, V respectively are block divided, transformed with DCT and encoded in real time. As a result, image data is compressed in real time.

However, because the present invention processes the Y, U, V data separately, it is necessary for FIFO memories 1302 and 1303 to have a capacity of one block for each color component. Further, it is necessary for FIFO memory 1204 to have enough capacity for temporarily storing the signals output from signal processing circuit 1203 while U/V data are read out from FIFO memories 1302 and 1303. Therefore, the present embodiment has the following structure.

(First Embodiment)

Figure 5:
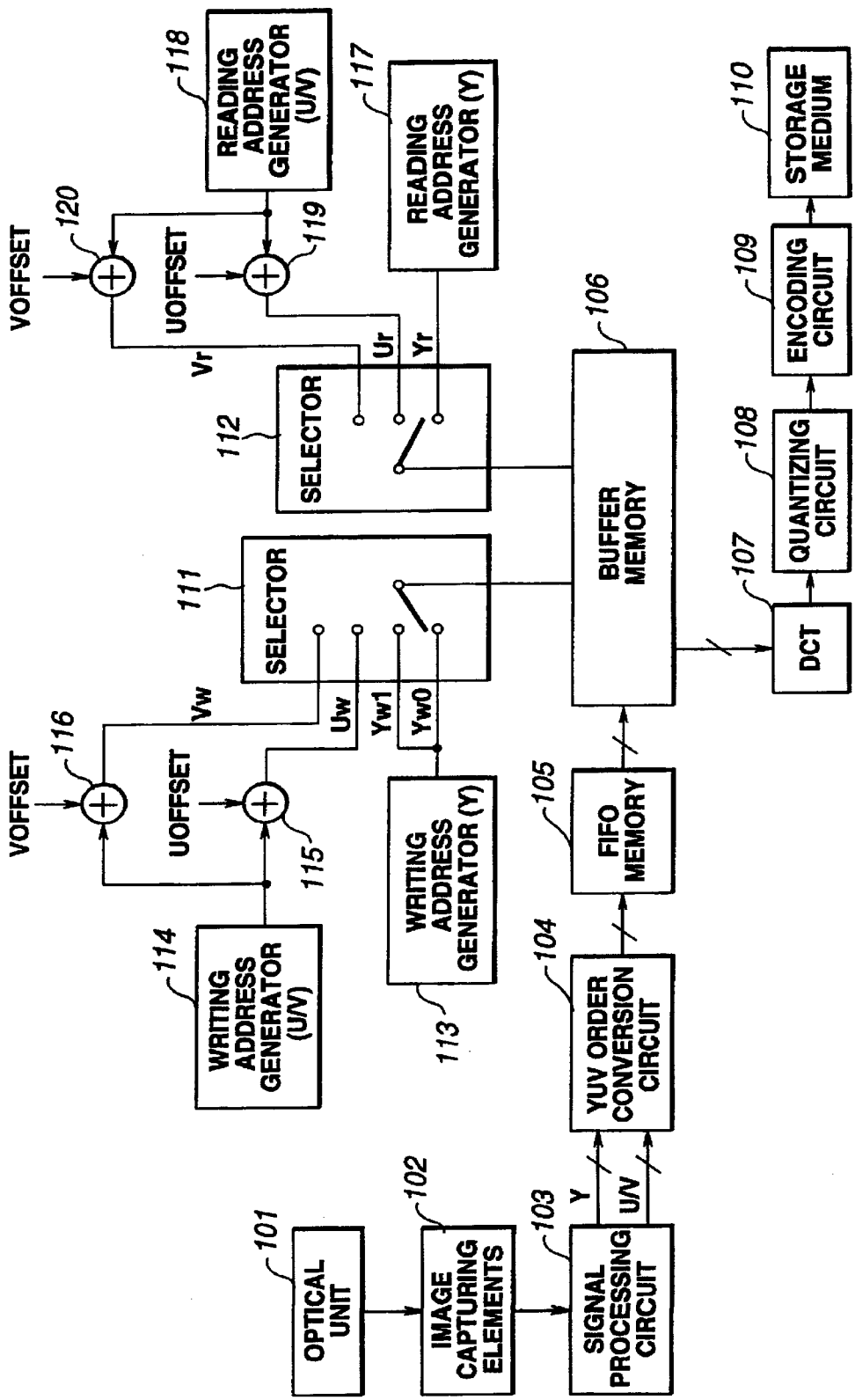
FIG. 5 shows a block diagram of the structure of the image compression apparatus according to the first embodiment of the present invention.

FIG. 5 shows a block diagram of the structure of the image compression apparatus according to the first embodiment of the present invention.

In FIG. 5, optical unit 101 comprises among other things a lens, a shutter and a stop. The light passing through optical unit 101 is focused on image pick-up device 102 which comprises among other things a CCD and makes an image on it.

Image processing circuit 103 processes the analog signal, which is output from image pick-up device 102 and representing an image, and outputs digital image signal composed of luminance signal Y and color difference signals U/V. YUV order conversion circuit 104 converts the order of the YUV data output from signal processing circuit 103. This processing will be explained in greater detail below.

The signal output from YUV order conversion circuit 104 is temporarily stored in FIFO memory 105. After that it is stored in buffer memory 106 which has the capacity for holding image data of 8 lines and reads out in a divided block form.

The image data divided into blocks is transformed with two-dimensional DCT by DCT 107 and quantized by quantizing circuit 108 and encoded with a variable coding method by encoding circuit 109. The resulting encoded image data is stored in storage medium 110 sequentially.

(Order Conversion Circuit)

Figure 6A:
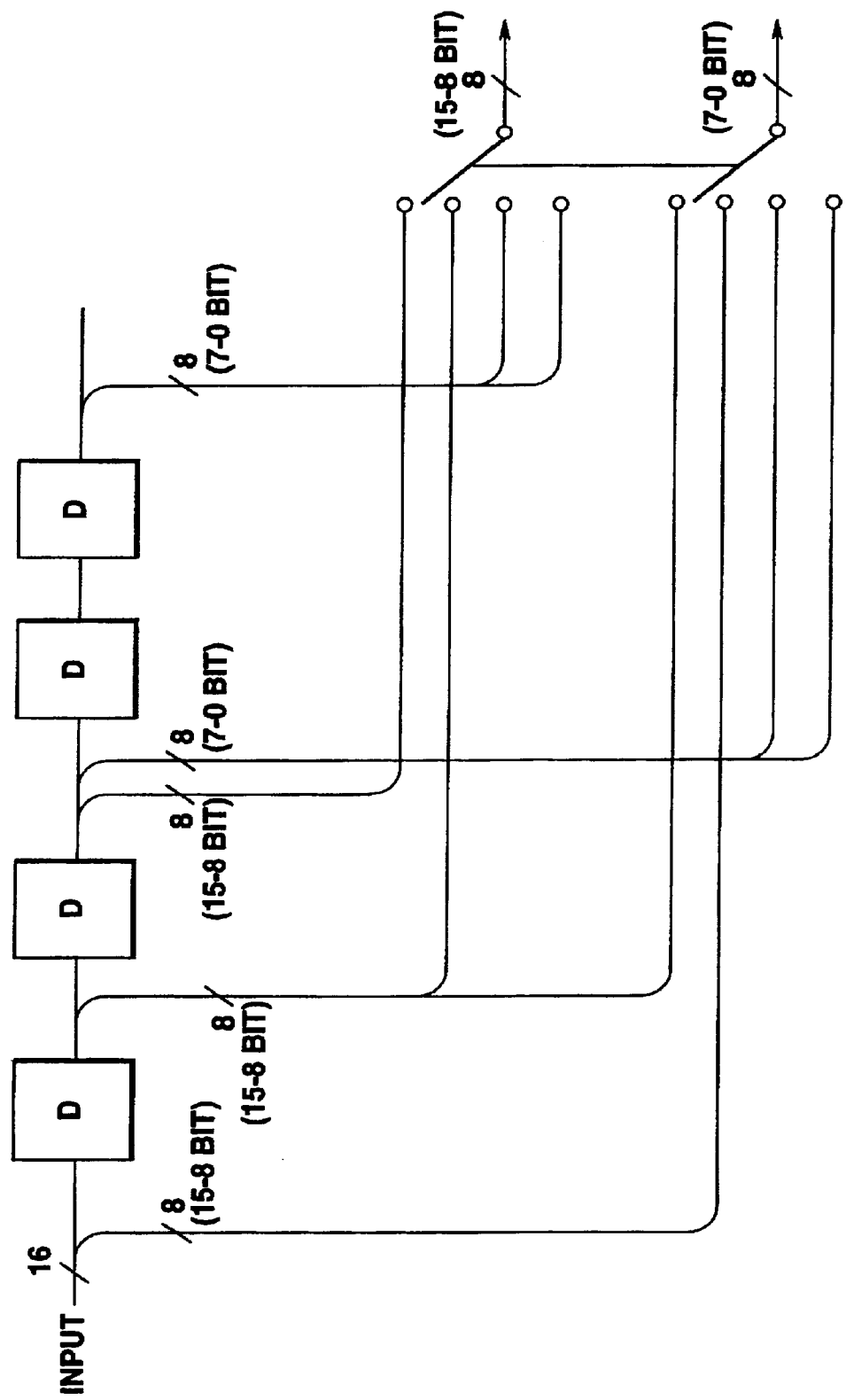
FIG. 6A shows a block diagram of the structure of the YUV order conversion circuit 104 shown in FIG. 5.
Figure 6B:
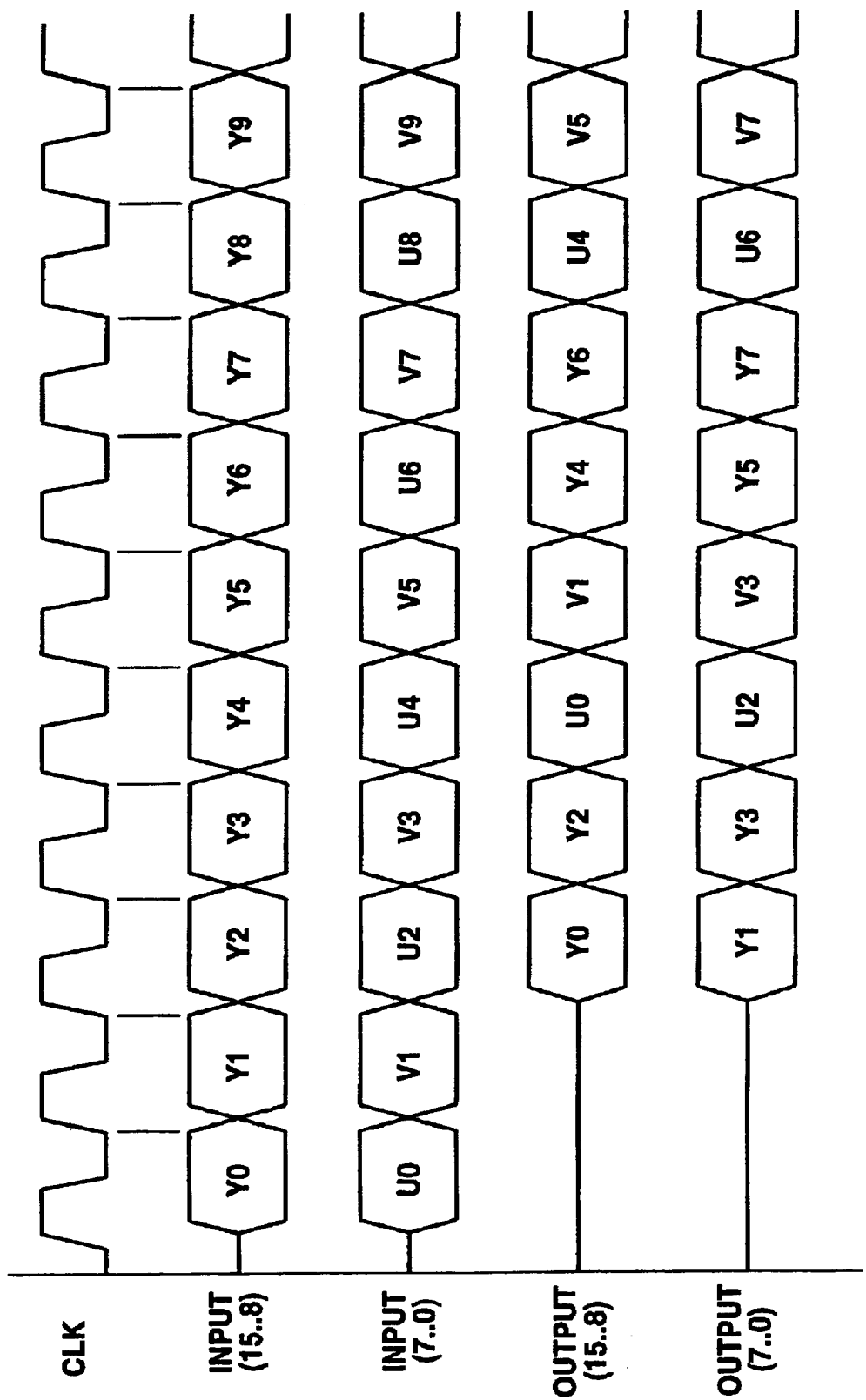
FIG. 6B shows an example of the input/output timing of YUV order conversion circuit 104.

FIG. 6A shows a block diagram of the structure of YUV order conversion circuit 104. YUV order conversion circuit 104 comprises four delay circuits and a pair of four-in-one-output switches which are linked each other. YUV order conversion circuit 104 changes the order of YUV data from signal processing circuit 103. As is shown in FIG. 6B, input data (Y0, U0), (Y1, V1), (Y2, U2), (Y3, V3) . . . is output as the data of (Y0, Y1), (Y2, Y3), (U0, U2), (V1, V3) . . . Here, the numbers express the pixel number. The order of the YUV data is re-arranged in units of MCU.

(Buffer Memory)

Figure 7:
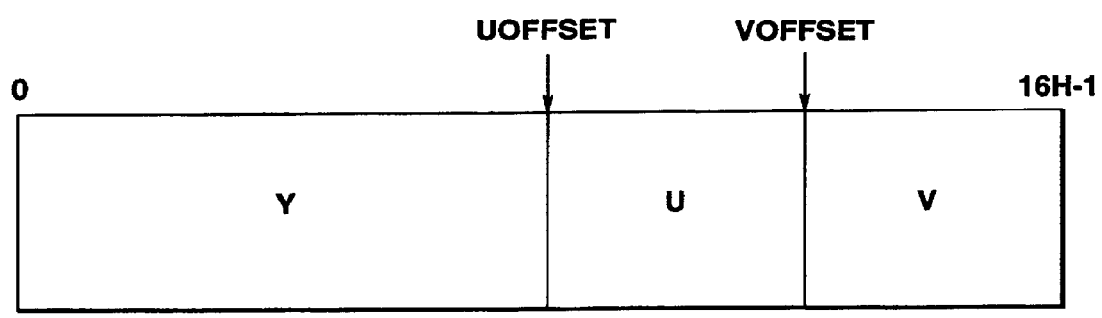
FIG. 7 shows an example of the memory area of buffer memory 106 shown in FIG. 5.

FIG. 7 shows an example of the memory area of buffer memory 106. The image data input to buffer memory 106 is written into a predetermined area of buffer memory 106 for each component of YUV. For example, Y data is written into buffer memory 106 from the address "0", U data from the address "U offset" and V data from the address "V offset". As a result, according to the preferred embodiment, two pairs of writing address generators and reading address generators are provided.

In FIG. 5, writing address generator (Y) 113 generates the address for writing the Y image data and writing address generator (U/V) 114 generates the address for writing the U/V image data. Reading address generator (Y) 117 generates the address for reading the Y image data and reading address generator (U/V) 118 generates the address for reading the U/V image data.

"U offset" is added to both of the addresses generated by writing address generator (U/V) 114 and reading address generator (U/V) 118 by adders 115 and 119. "V offset" is added to both of the addresses generated by writing address generator (U/V) 114 and reading address generator (U/V) 118 by adders 116 and 120.

The writing address of buffer memory 106 is obtained by selecting periodically, the output of writing address generator 113 (Yw0), the output of writing address generator 113 (Yw1), the output of adder 115 (Uw) and the output of adder 116 (Vw).

On the other hand, reading addresses of buffer memory 106 is obtained by selecting the address, which corresponds to the color component of the block currently being read out, from among the output of reading address generator 117 (Yr), the output of adder 119 (Ur) and the output of adder 120 (Vr) by selector 112.

The access to buffer memory 106 is controlled in units of MCU. When reading out image data of one MCU from buffer memory 106 is finished, it is possible to write the image data of one MCU into buffer memory 106.

Figure 8:
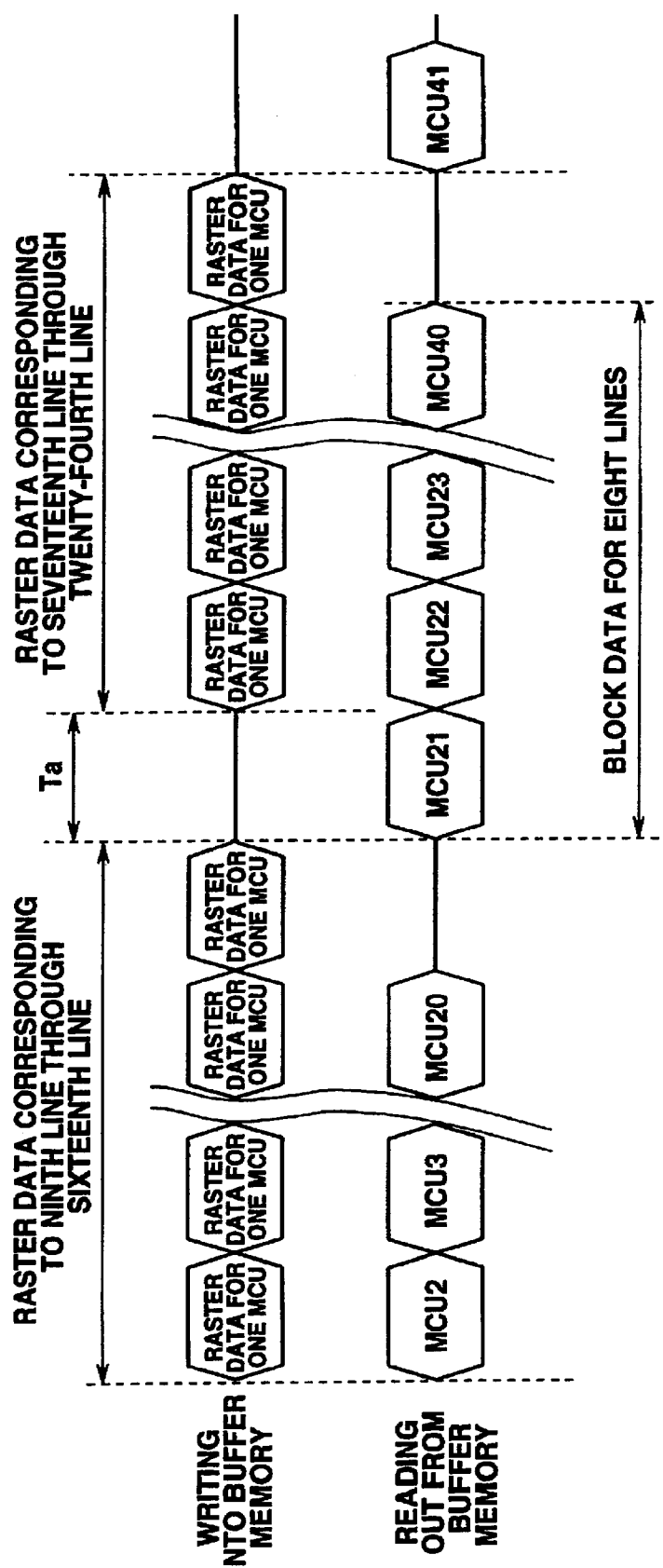
FIG. 8 shows an example of the access to buffer memory 106.

FIG. 8 shows an example of the access to buffer memory 106. In FIG. 8, the horizontal size of one frame is 320 pixels. As one MCU includes two blocks of Y and one block each of U/V (total 4 blocks), the image data of 8 lines are divided into 20 MCU.

$$320 \text{ pixels}/8 \text{ pixels} \times 2/4 = 20 \text{ MCU}$$

On the other hand, as shown in FIG. 8, a predetermined interval Ta is provided after writing the image data of the eighth line into buffer memory 106. In this period Ta, it is prohibited to write new data into buffer memory 106. That is, the interval Ta is a period in which the block form image data of one MCU from buffer memory 106 is read out in order to make a free space of buffer memory 106 for writing the raster form image data of the next line for one MCU. Of course, if buffer memory 106 has the capacity of 8 lines plus one MCU, it is not necessary to provide the interval Ta.

(Address Generation Method)

As described above, the access to buffer memory 106 is performed in units of MCU. Therefore, it is necessary to generate the reading/writing address based on the corresponding specific rules.

The lower 3-bits of the address is generated by simple linear count-up. That is, it may be generated in the order such as 0,1,2,3,4,5,6,7,0,1,2, . . .

On the other hand, upper 4-bits of the address is generated as follows. In the following explanation, 8 pixels of image data in the raster direction is called 1 segment. One line in the horizontal direction is expressed by 1 H(horizontal line).

In order to perform reading/writing of buffer memory 106 on the segments in units of MCU, the segments can be read out from/writing into buffer memory 106 in the order shown in FIG. 14. Here, the pixel number of 1H of one picture is a multiple of 8. When the image data of the first 8H of one picture is written into buffer memory 106, the address is generated linearly.

FIGS. 15A–15E show the change of the segments written in buffer memory 106 in a case where a part of one picture is composed of 96 pixels (12 pixels×8 lines). Here, in FIG. 15A, the numbers in ( ) express the addresses of the cells and correspond to the upper 4-bits of the addresses generated by address generator.

If An(X) expresses the address of the cell which is read out/written in at the n-th time, the address of segment 31 ,for example, changes as follows:

A1(31)__31

A2(31)__87

A3(31)__94

A4(31)__83

If the number of pixels in 1 H is expressed 8 h, the address of the cell which is read out/written in at the n-th time is as follows:

$$An(X) = \{(X \cdot h^n) \bmod 8h\} + \text{int}\{X \cdot h^n / 8h\} \quad (1)$$

(Here, h^ expresses the n-th power of h.)

According to the formula (1), $$An+1(X) = ha+b \text{ (When } An(X) = a+8b) \quad (2)$$

$$An(0) = 0 \text{ (When } X=0) \quad (3)$$

$$An(X+1) = \{(An(X)+An(1)) \bmod 8h\} + \text{int}\{(An(X)+An(1))/8h\} \quad (4)$$

Figure 16:
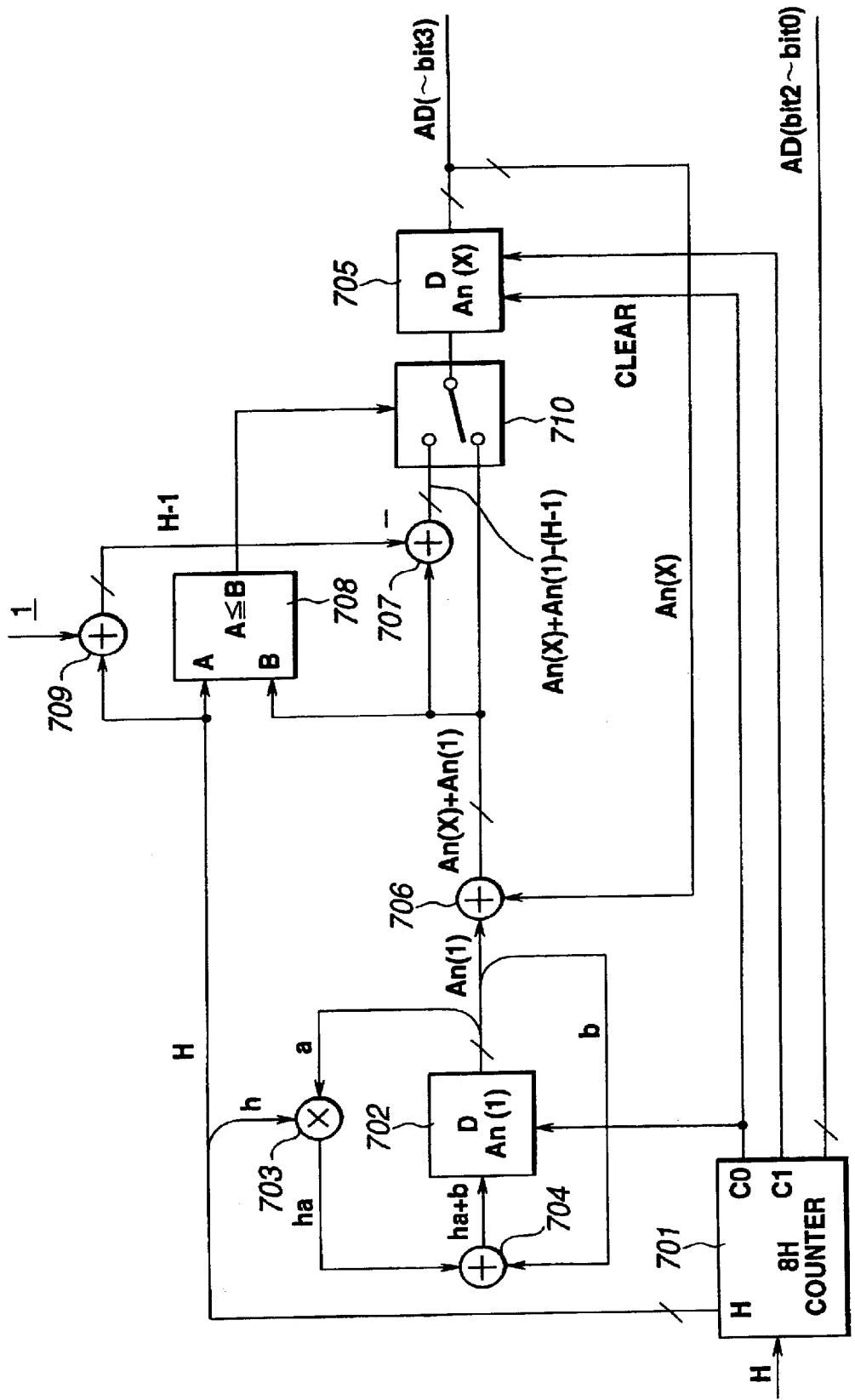
FIG. 16 shows an example of the structure of the address generating circuit of buffer memory 106.

As a result, the address generator is structured as shown in FIG. 16.

In FIG. 16, 701 is a counter, 702,705 are latch circuits, 703 is a multiplier, 704,706,707 and 709 are adders, 708 is a comparator, 710 is a selector.

(FIFO memory)

Because writing data into buffer memory is prohibited during the term Ta, it is necessary to store the image data which is output from signal processing circuit 103 in FIFO memory 105 temporarily.

Figure 9:
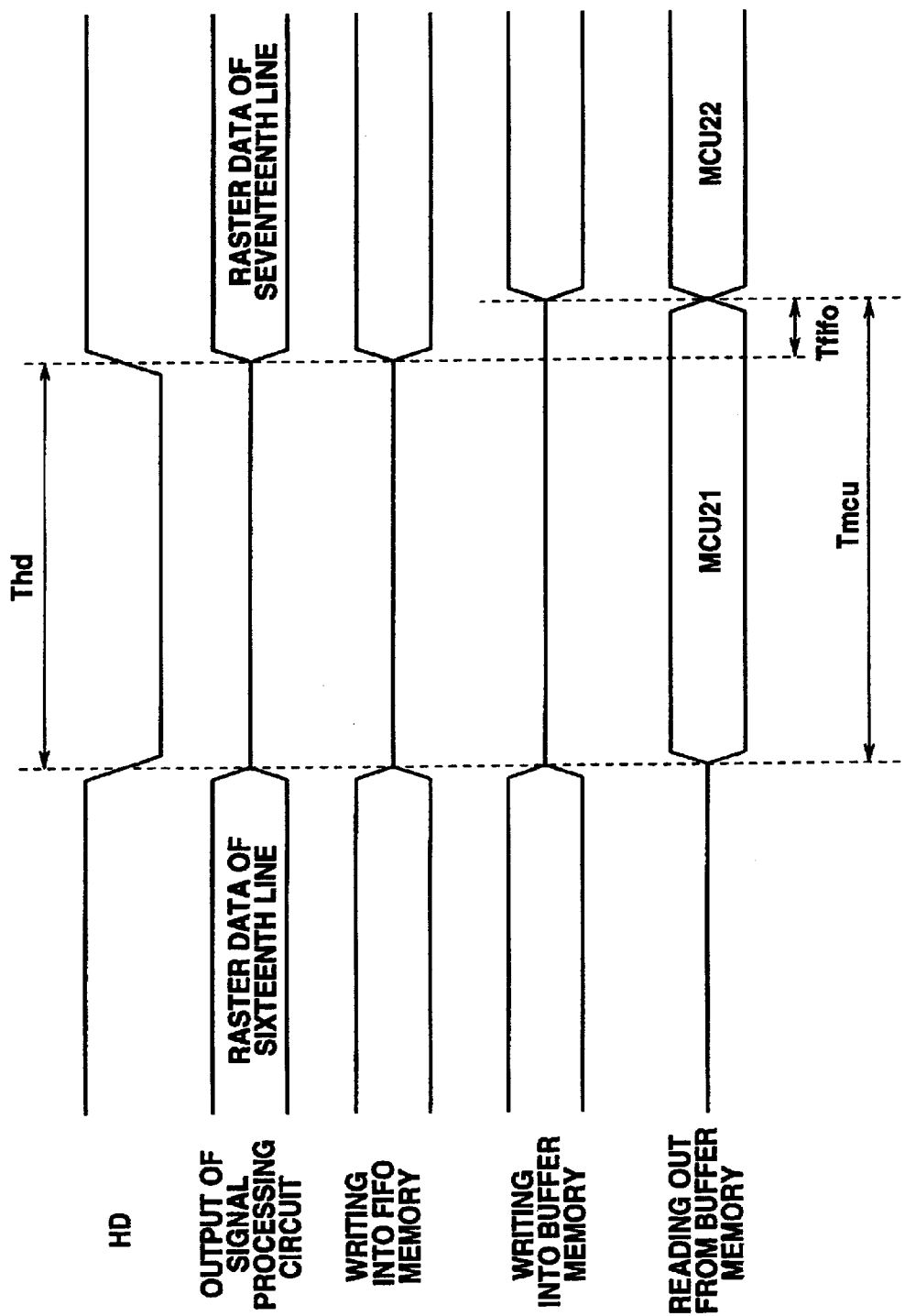
FIG. 9 illustrates the horizontal blanking period Thd.

However, the term Ta starts when the raster form image data for 8 lines is written into buffer memory 105 and the starting time is in synchronism with the starting time of the horizontal blanking period Thd as shown in FIG. 9.

The horizontal blanking period Thd is determined based on the kind and operation method of the image pick-up device such as CCD. In the period Thd, image data is not output from image pick-up device 1202.

Therefore, the relationship among the period Tfifo in which it is necessary to write image data into FIFO memory 105, the period Tmcu which is necessary to read the image data for one MCU out of buffer memory 106 and the horizontal blanking period is as follows:

$$Tfifo = Tmcu - Thd$$

Since Tmcu>Tfifo, the capacity of FIFO memory 105, in which the image data generated during the period Tfifo is stored, does not have to be more than the image data amount of one MCU. Further, FIFO memory 105 is not necessary if Tfifo is negative in the above formula.

According to the preferred embodiment, the order of the image data is rearranged for each component by YUV order conversion circuit 104 and is stored in units of MCU in buffer memory 106 which storage area is divided for each component. Therefore, it is possible to read out the image data for each component in units of MCU from buffer memory 106. That means, the image data can be read out from the buffer memory 106 in accordance with the form of the image data supplied to DCT 107. As a result, the efficiency of the read/write access of buffer memory is improved. Further, it becomes unnecessary to provide buffer memory 1207 shown in FIG. 2 which comprises FIFO memory for dividing the U/V data. Moreover, because reading/writing of the buffer memory 106 is performed in units of MCU, it is possible to reduce the requirement of memory capacity of FIFO memory 105 or it is may be unnecessary to provide FIFO memory 105 at all.

Although image data compression is explained in the above embodiment, it is possible to convert block form image data to raster form image data in image data decompression by using the similar buffer memory structure.

In the above embodiment, the output data of signal processing circuit 103 is composed of Y,U,V (Y:U:V=4:2:2). If the ratio is Y:U:V=4:1:1, YUV order conversion circuit 104 may be structured to output the YUV data in the order such as (Y0, Y1), (Y2, Y3), (Y4, Y5), (Y6, Y7), (U0, U4), (V2, V6), (Y8, Y9) . . . If the ratio is Y:U:V=4:4:4, YUV order conversion circuit 104 may be structured to output the YUV data in the order such as (Y0,Y1), (U0,U1), (V0,V1), (Y2,Y3),(U2,U3),(V2,V3),(Y4,Y5) . . .

(Second Embodiment)

In this embodiment, YUV order conversion circuit 104 and the writing address of the buffer memory 106 in the first embodiment have been modified.

Figure 10:
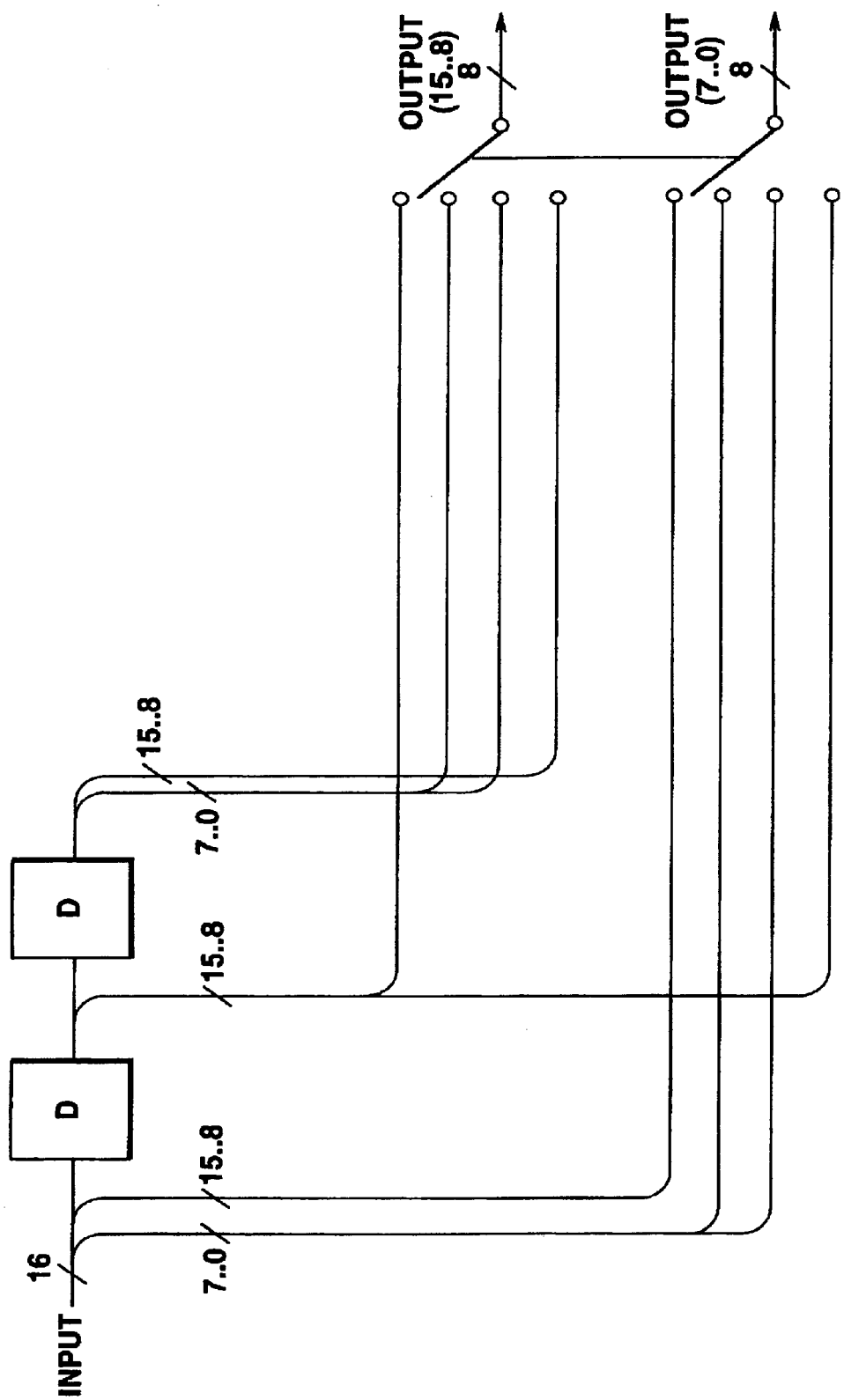
FIG. 10 shows a block diagram of the structure of the YUV order conversion circuit according to the second embodiment of the present invention.
Figure 11:
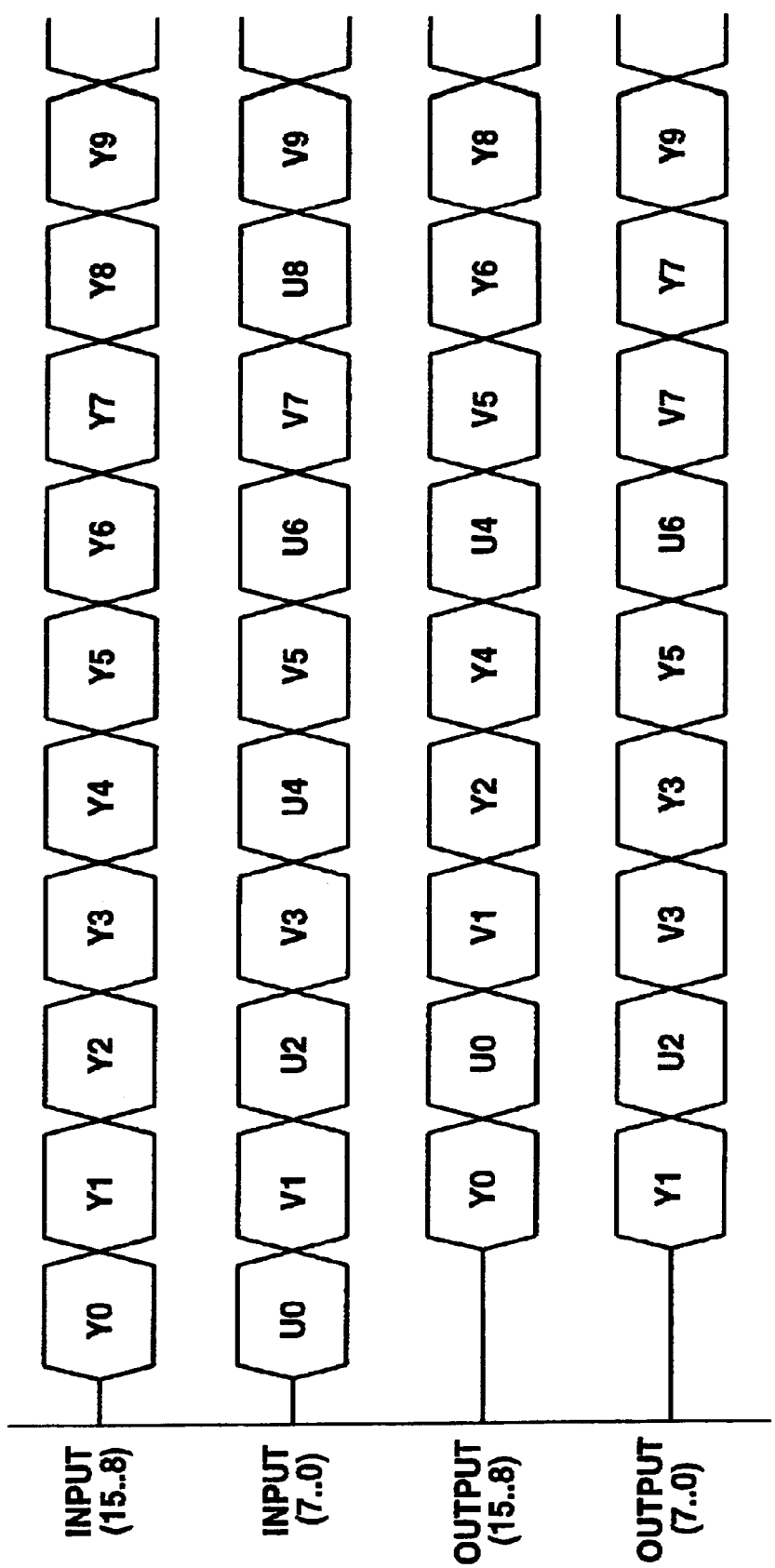
FIG. 11 shows an example of the input/output timing of YUV order conversion circuit shown in FIG. 10.

FIG. 10 shows a block diagram of the structure of YUV order conversion circuit 104 according to the second embodiment of the present invention. YUV order conversion circuit 104 comprises two delay circuits D and two linked 4-input/1-output switches and converts the order of the YUV data supplied from signal processing circuit 103. For example, as shown in FIG. 11, input data (Y0,U0),(Y1,V1), (Y2,U2),(Y3,V3) is output in such order as (Y0,Yl),(U0, U2),(Vl,V3),(Y2,Y3) . . .

In a case where the address of n-th writing into buffer memory 106 is defined as AD(n) in the first embodiment, the address of n-th writing into buffer memory 106 is defined as AD'(n) in this second embodiment is as follows:

AD'(4n)=AD(4n)
AD'(4n+1)=AD(4n+2)
AD'(4n+2)=AD(4n+3)
AD'(4n+3)=AD(4n+1)

Therefore, the writing address having the above relation is generated by writing address generator (Y) 113 and writing address generator (U/V) 114.

(Third Embodiment)

In the first embodiment, the starting timing of reading block data from buffer memory 106 is synchronized with the horizontal blanking period Thd.

Figure 12:
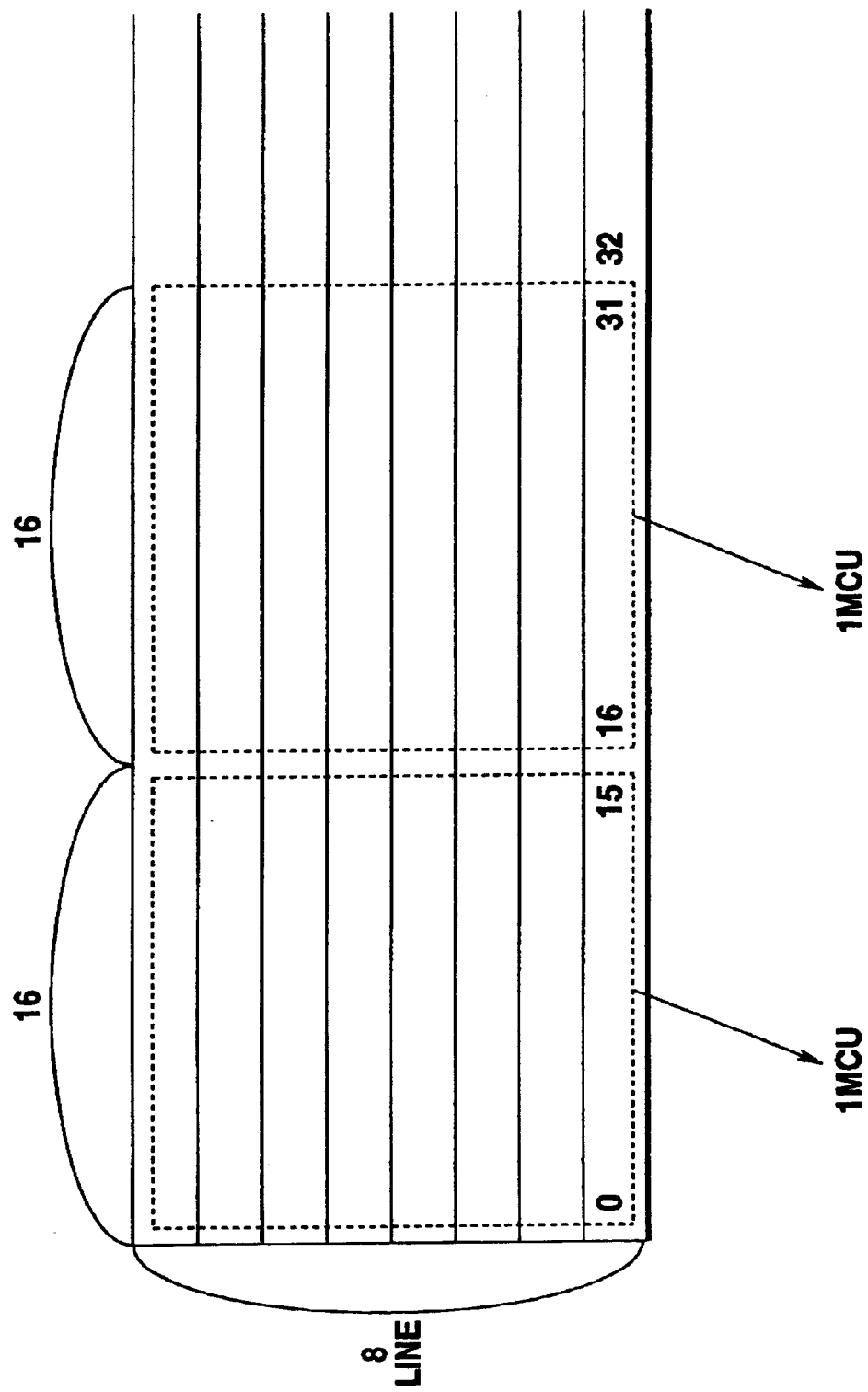
FIG. 12 illustrates the operation of the apparatus according to the third embodiment of the present invention.

However, when the output of the signal processing circuit 103 is Y:U:V=4:2:2, as is shown in FIG. 12, it is possible to read one MCU data which is divided into blocks can be read out when the sixteenth image data in 8n-th(n is natural number) line is written into buffer memory 106.

Figure 13:
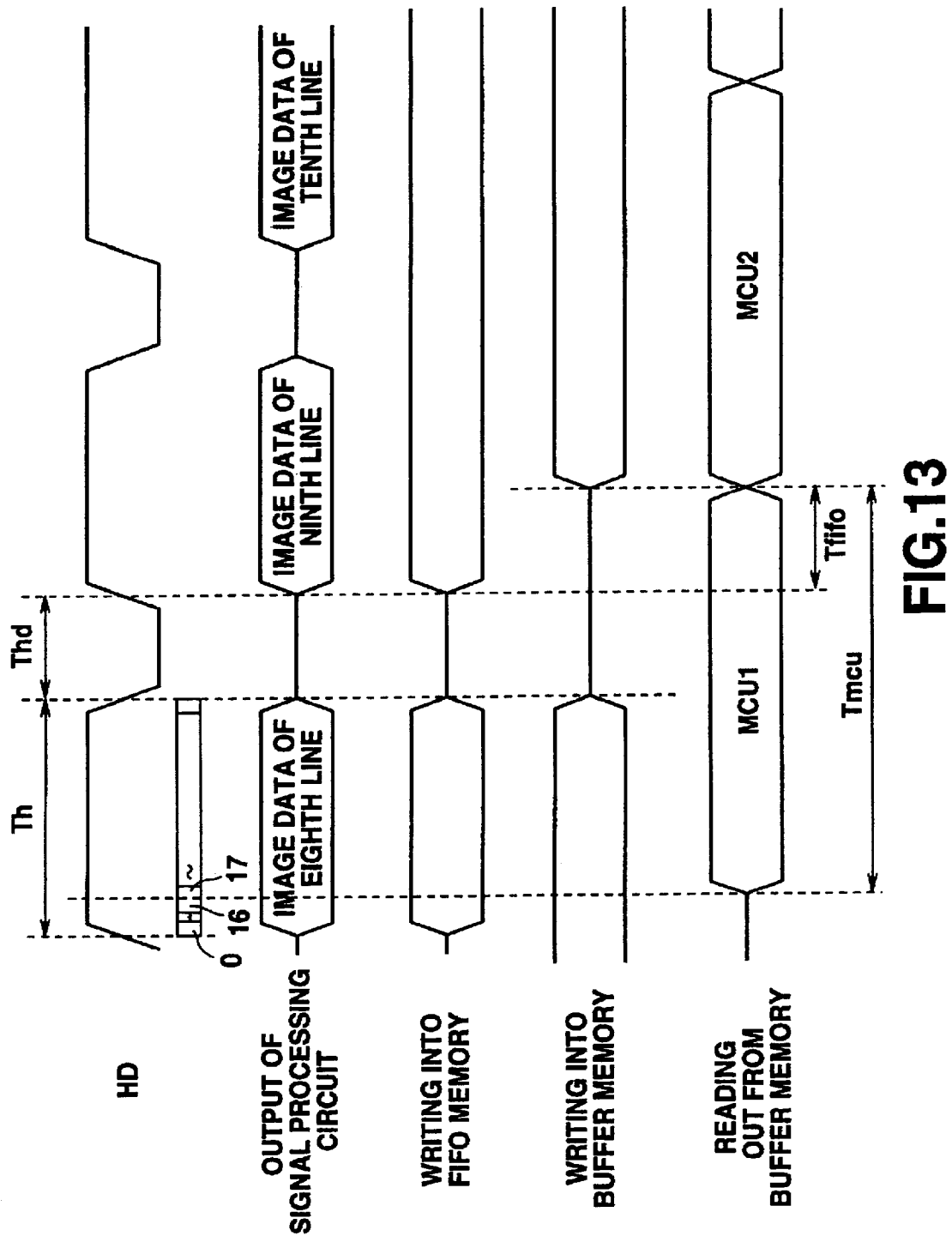
FIG. 13 shows an example of the writing timing of FIFO memory 105 and buffer memory 106 according to the third embodiment.

Further, if the data ratio is Y:U:V=4:2:2, one MCU includes 256 pixel image data. Therefore, when the writing of the one MCU data which is divided into blocks is finished, it is certainly possible to read next one MCU data out from buffer memory 106. That is, it is possible to start reading one MCU data out from buffer memory 106 based on the detection of the writing of the sixteenth image data in 8n-th line. As a result, the timings of writing into FIFO memory 105 and writing into buffer memory 106 are as shown in FIG. 13. In a case where image data for 1 line is composed of H pixels, the relation among the periods Tfifo, Tmcu and Thd is as follows:

$$Tfifo = Tmcu - (H-16)/HXTh - Thd$$

(Th: the period in which image data for 1 line is output)

Due to the fact that Tmcu>Tfifo, the capacity of FIFO memory 105, in which the image data generated during the period Tfifo, is stored can be less than the data size of one MCU. Further, if Tfifo is negative, FIFO memory 105 can be removed.

According to the above embodiments, it is possible to reduce the capacity of the memory for converting raster form image data into block form image data in an image data compression/decompression method or apparatus. Therefore, it is possible to divide raster form image data into blocks, to perform DCT, quantization, encoding and to compress the image data by using the small and low-power circuit structure.

The present invention can be applied to not only a system comprising a plurality of devices (for example, a host computer, an interface apparatus, a reader, a printer and so on), but also to a single device (for example, a copying machine, a facsimile machine and so on).

The purpose of the present invention can be achieved by providing program codes of software for realizing the above mentioned function into a computer within the apparatus or the system connected to a various device, and making the computer (ex. CPU, MPU) in the apparatus or the system operate in accordance with the stored program, in order to realize the function of the above mentioned embodiment by using a device.

In this case, the program codes of said software are used to realize the above mentioned function of the embodiment. The program codes and means for supplying the codes to the computer, for example, the memory medium storing the program codes comprise the invention. For example, floppy disks, hard disks, optical disks, opto-magnetic disks, CD-ROM, CD-R, magnetic tapes, non-volatile memory card, ROM can be used as the memory medium storing the program codes.

The above mentioned function of the embodiment can be realized not only by the computer which executes the supplied program codes but also by the computer which executes the supplied program codes together with the OS (operating system) operating the computer or other application software. Further, the supplied program codes can be stored in the memory provided in a function extension board or a function extension unit connected to the computer, after that the CPU and so on, mounted on the function extension board or the function extension unit, may execute a part of or all of the processing based on the instruction of the program codes.

While present invention is described above with respect to what is currently considered to be its preferred embodiments, it is to be understood that the invention is not limited to the disclosed embodiments. To the contrary, the invention is intended to cover various modifications and equivalent arrangements included within the spirit and scope of the appended claims.

What is claimed is:

1. An image processing apparatus which converts image data between a raster form and a block form, comprising:

an image supplier for supplying first image data having luminance and color difference components in raster form, wherein the luminance and color difference components are arranged in a first arrangement in the first image data;

a re-arranger for changing the first arrangement of the luminance and color difference components of the first image data to generate second image data in which luminance and color difference components in raster form are arranged in a second, different arrangement;

a memory for storing the second image data in raster form; and an outputter for outputting second image stored by the memory in block form.

2. The apparatus according to claim 1, wherein the first image data has both the luminance and color difference components arranged in a predetermined unit area of the first image data, and the second image data has either the luminance or color difference components arranged in a corresponding predetermined unit area of the second image data.

3. The apparatus according to claim 1, wherein luminance and color difference components of the second image data are stored in different areas of said memory.

4. The apparatus according to claim 1, further comprising an image transformer for performing an orthogonal transformation to the second image data, after the second image data is read out from the memory, wherein reading access of the memory means is performed in units of a block orthogonal transformation.

5. The apparatus according to claim 1, wherein writing of the second image data is prohibited for a predetermined time period after a predetermined amount of the second image data is written into the memory.

6. The apparatus according to claim 5, wherein the predetermined time period is a time period which is necessary for reading the image data of one block unit of an orthogonal transformation.

7. The apparatus according to claim 4, further comprising a quantizer for quantizing the second image data which has been transformed by said image transformer; and an encoder for performing variable-length encoding on image data output from said quantizer.

8. An image processing method which converts image data between a raster form and a block form, comprising the steps of:

a supply step of supplying first image data having luminance and color difference components in raster form, wherein the luminance and color difference components are arranged in a first arrangement in the first image data;

a rearranging step of changing the first arrangement of the luminance and color difference components of the first image data to generate second image data in which luminance and color difference components in raster form are arranged in a second, different arrangement;

storing the second image data in raster form in a memory; and outputting second image from the memory in block form.

9. A computer-executable program product stored on a computer readable medium, the computer-executable program product converting image data between a raster form and a block form, said computer program product including:

computer readable program code to supply first image data having luminance and color difference components in raster form, wherein the luminance and color difference components are arranged in a first arrangement in the first image data;

computer readable program code to change the first arrangement of the luminance and color difference components of the first image data to generate second image data in which luminance and color difference components in raster form are arranged in a second, different arrangement;

computer readable program code for storing the second image data in raster form in a memory; and computer readable program code for outputting second image from the memory in block form.

* * * * *

UNITED STATES PATENT AND TRADEMARK OFFICE
CERTIFICATE OF CORRECTION

PATENT NO. : 6,212,300 B1
APPLICATION NO. : 09/092081
DATED : April 3, 2001
INVENTOR(S) : Hideyuki Rengakuji It is certified that error appears in the above-identified patent and that said Letters Patent is hereby corrected as shown below:

COLUMN 1

Line 25, "hold" should read --holds--;
Line 26, "image" (first occurrence) should read --the image--; and
Line 57, "memory," should read --memory, and--.

COLUMN 2

Line 8, "followed" should read --following--.

COLUMN 3

Line 15, "a" should read --the--;
Line 17, "pixel" should read --pixel:-- and "is" should read --are--;
Line 18, "is" should read --are--;
Line 19, "is" should read --are--; and
Line 20, "is" should read --are--.

COLUMN 4

Line 36, "senting" should read --sents--; and
Line 55, "linked" should read --linked with--.

COLUMN 7

Line 8, "is" should be deleted; and
Line 53, "can" should read --and can--.

UNITED STATES PATENT AND TRADEMARK OFFICE
CERTIFICATE OF CORRECTION

PATENT NO. : 6,212,300 B1
APPLICATION NO. : 09/092081
DATED : April 3, 2001
INVENTOR(S) : Hideyuki Rengakuji It is certified that error appears in the above-identified patent and that said Letters Patent is hereby corrected as shown below:

COLUMN 8

Line 22, "above" should read --above- --;
Line 27, "above mentioned" should read --above-mentioned--;
Line 30, "above mentioned" should read --above-mentioned--; and
Line 38, "above mentioned" should read --above-mentioned--.

COLUMN 9

Line 18, "claim 1," should read --claim 2,--.

Signed and Sealed this

Twenty-seventh Day of May, 2008

JON W. DUDAS
*Director of the United States Patent and Trademark Office*